US008980389B2

(12) United States Patent
Pecorini et al.

(10) Patent No.: US 8,980,389 B2
(45) Date of Patent: Mar. 17, 2015

(54) COPOLYESTERS AND BLENDS WITH IMPROVED RECYCLABILITY, PROCESSES FOR THEIR MANUFACTURE, AND ARTICLES PREPARED THEREFROM

(75) Inventors: Thomas Joseph Pecorini, Kingsport, TN (US); Spencer Allen Gilliam, Kingsport, TN (US); Ignacio Garcia, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 598 days.

(21) Appl. No.: 12/255,237

(22) Filed: Oct. 21, 2008

(65) Prior Publication Data

US 2009/0181196 A1    Jul. 16, 2009

Related U.S. Application Data

(60) Provisional application No. 61/020,859, filed on Jan. 14, 2008.

(51) Int. Cl.
*B29D 22/00* (2006.01)
*C08G 63/199* (2006.01)
*B29C 49/00* (2006.01)
*C08J 5/00* (2006.01)
*B29C 49/04* (2006.01)

(52) U.S. Cl.
CPC .......... *C08G 63/199* (2013.01); *B29C 49/0047* (2013.01); *B29C 49/04* (2013.01); *C08J 5/00* (2013.01); *C08J 2367/00* (2013.01)
USPC ....................................... 428/35.7

(58) Field of Classification Search
CPC .. B29C 49/0047; B29C 49/04; C08G 63/199; C08J 2367/00; C08J 5/00
USPC ....................................... 428/35.7
See application file for complete search history.

(56) References Cited

U.S. PATENT DOCUMENTS

| 3,772,405 | A | 11/1973 | Hamb |
| 4,161,579 | A | 7/1979 | Edelman et al. |
| 4,219,527 | A | 8/1980 | Edelman et al. |
| 4,234,708 | A | 11/1980 | Edelman et al. |
| 4,554,328 | A | 11/1985 | Sinker et al. |
| 4,554,329 | A | 11/1985 | Sinker et al. |
| 4,609,721 | A | 9/1986 | Kirshenbaum et al. |
| 4,983,711 | A | 1/1991 | Sublett et al. |
| 5,235,027 | A | 8/1993 | Thiele et al. |
| 5,372,864 | A | 12/1994 | Weaver et al. |
| 5,384,377 | A | 1/1995 | Weaver et al. |
| 5,442,036 | A | 8/1995 | Beavers et al. |
| 5,523,382 | A | 6/1996 | Beavers et al. |
| 5,654,347 | A | 8/1997 | Khemani et al. |
| 5,696,176 | A | 12/1997 | Khemani et al. |
| 6,100,320 | A | 8/2000 | Cobb et al. |
| 6,632,390 | B1 | 10/2003 | Shelby et al. |
| 6,808,805 | B2 | 10/2004 | Shelby et al. |
| 8,604,138 | B2 | 12/2013 | Pecorini et al. |
| 8,604,139 | B2 | 12/2013 | Pecorini et al. |
| 2004/0260054 | A1 | 12/2004 | Lee et al. |
| 2008/0093777 | A1 | 4/2008 | Sequeira et al. |
| 2009/0181202 | A1 | 7/2009 | Pecorini et al. |

FOREIGN PATENT DOCUMENTS

| EP | 1188540 | | 3/2002 |
| EP | 1188540 | A2 * | 3/2002 |
| EP | 1918327 | | 5/2008 |
| JP | 07-179581 | | 7/1995 |
| JP | 09-302078 | | 11/1997 |
| JP | 2003119260 | | 4/2003 |
| JP | 2003252969 | | 9/2003 |
| JP | 2005154731 | | 6/2005 |
| WO | 2007027043 | | 3/2007 |

OTHER PUBLICATIONS

International Search Report for corresponding PCT/US2009/000152, Filed Jan. 9, 2009.
Copending U.S. Appl. No. 12/255,245, filed Oct. 21, 2008, Thomas Joseph Pecorini et al.
Copending U.S. Appl. No. 12/255,243, filed Oct. 21, 2008, Thomas Joseph Pecorini et al.
ASTM D1003, Method A.
ASTM D3418.
Notification of Transmittal of the International Search Report and the Written Opinion of the International Searching Authority, or the Declaration for corresponding PCT/US2009/000137, Filed Jan. 9, 2009.
Notification of Transmittal of the International Serach Report and the Written Opinion of the International Searching Authority, or the Declaration for corresponding PCT/US2009/00167, Filed Jan. 9, 2009.

(Continued)

*Primary Examiner* — James Yager
(74) *Attorney, Agent, or Firm* — B. J. Boshears; Louis N. Moreno

(57) ABSTRACT

Described as one aspect of the invention are extrusion blow molded articles comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 42 to about 60 mole % ethylene glycol residues; and
    (ii) about 40 to about 58 mole % residues of 1,4-cyclohexanedimethanol;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

12 Claims, No Drawings

(56) References Cited

OTHER PUBLICATIONS

USPTO Office Action dated Nov. 2, 2011 in copending application U.S. Appl. No. 12/255,243.
USPTO Office Action dated Nov. 2, 2011 in copending application U.S. Appl. No. 12/255,245.
USPTO Office Action dated May 2, 2012 for U.S. Appl. No. 12/255,245.
USPTO Office Action dated Apr. 6, 2012 for U.S. Appl. No. 12/255,243.
USPTO Office Action dated Nov. 28, 2012 for copending U.S. Appl. No. 12/255,243.
USPTO Office Action dated Nov. 28, 2012 for copending U.S. Appl. No. 12/255,245.

* cited by examiner

COPOLYESTERS AND BLENDS WITH IMPROVED RECYCLABILITY, PROCESSES FOR THEIR MANUFACTURE, AND ARTICLES PREPARED THEREFROM

CROSS-REFERENCES TO RELATED APPLICATION

This application claims the benefit of U.S. Provisional Application Ser. No. 61/020,859 filed on Jan. 14, 2008.

FIELD OF THE INVENTION

This invention generally relates to copolyesters, blends, and articles made therefrom. These copolyesters possess improved recyclability in the polyethylene terephthalate (PET) recycle process, and can be used in extrusion blow-molding processes. In another embodiment, this invention pertains to copolyesters comprising residues of terephthalic acid, ethylene glycol, 1,4-cyclohexanedimethanol, and at least one branching agent monomer, having a certain combination of melt strength, high glass transition temperature ($T_g$), certain inherent viscosities, low haze values, and short crystallization half-times, which can be easily formed into shaped articles, including relatively large rigid containers.

BACKGROUND OF THE INVENTION

Consumers value the ability to see the contents of their packages. Consumers also appreciate the toughness and gloss of containers made from polyester. Because of this combination of attributes, containers made from polyethylene terephthalate (PET) produced by the injection stretch blow molding process (ISBM) are the most common type of transparent container on the market. However, the ISBM process is limited to uniform shapes and cannot produce bottles that contain a through-handle. Handles are desirable in larger bottle sizes, where gripping a round or square container becomes cumbersome. Larger size bottles containing a through handle are believed to be produced only by the extrusion blow molding (EBM) process.

The PET (polyethylene terephthalate) compositions used in the injection stretch blow molding process (ISBM) cannot be easily processed using the extrusion blow molding (EBM) process due to their high crystalline melting points and rapid crystallization rates, which gives them a low melt strength. U.S. Pat. No. 4,983,711 describes totally amorphous or slowly crystallizing copolyester compositions related to PET that are particularly useful in extrusion blow molding processes. These compositions comprise terephthalic acid or DMT (1,4-dimethyl terephthalate) moieties with ethylene glycol residues and 25-75 mole % 1,4-cyclohexanedimethanol residues and 0.05 to 1 mole % of a branching agent. These compositions are particularly desirable for extrusion blow molded beverage containers since they yield containers with clarity, gloss and toughness similar to ISBM PET containers.

Unfortunately, containers made from compositions described by U.S. Pat. No. 4,983,711 can cause problems in the PET recycle stream. Ground flake from these containers can stick to the walls of the dryer or agglomerate with ISBM PET container flake in a dryer set at 140-180° C. Mixing ground flake from these containers into ISBM PET container flake could also result in hazy film, sheet or bottles. It is possible to sort out the compositions described in U.S. Pat. No. 4,983,711 from the PET recycle stream, but a much more desirable solution is to find a material that can be both extrusion blow molded into transparent containers, but will be non-problematic in the PET recycle stream at levels much higher than they will be present in the recycle stream.

Thus, there is a need in the art for a transparent material that will crystallize more slowly than the PET used in injection stretch blown applications so that it can be used in extrusion blow molding and profile extrusion processes and that is also non-problematic in the PET recycle stream. Such a material has a combination of one or more of low haze values, short crystallization half-times, and lack of significant stickiness to manufacturing equipment when being processed.

SUMMARY OF THE INVENTION

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component consisting essentially of:
  (i) about 42 to about 60 mole % ethylene glycol residues; and
  (ii) about 40 to about 58 mole % residues of 1,4-cyclohexanedimethanol; and
  (iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;

(ii) about 0 to about 10 mole % of aromatic and/or aliphatic dicarboxylic acid residues having up to 20 carbon atoms; and
(b) a glycol component consisting of:
  (i) about 42 to about 60 mole % ethylene glycol residues; and
  (ii) about 40 to about 58 mole % residues of 1,4-cyclohexanedimethanol;
  (iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol and neopentyl glycol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of 1,4-cyclohexanedimethanol;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component consisting essentially of:
  (i) about 42 to about 60 mole % ethylene glycol residues; and (ii) about 40 to about 58 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which consists of:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.70 to 0.80 dL/g as determined in 60/40 (wt/wt) phenol/tetrachloroethane at a concentration of 0.25 g/50 ml at 25° C.; and which has a haze value of less than 3%, as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.70 to 0.80 dL/g as determined in 60/40 (wt/wt) phenol/tetrachloroethane at a concentration of 0.25 g/50 ml at 25° C.; and which has a haze value of less than 3%, as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol and neopentyl glycol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.70 to 0.80 dL/g as determined in 60/40 (wt/wt) phenol/tetrachloroethane at a concentration of 0.25 g/50 ml at 25° C.; and which has a haze value of less than 3, as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and (ii) about 40 to about 68 mole % residues of 1,4-cyclohexanedimethanol;
(c) at least one branching agent in the amount of 0.01 to 1.0 mole %;
wherein the total mole % of the dicarboxylic acid component is 100 mole %,
wherein the total mole % of the glycol component is 100 mole %; and
wherein the inherent viscosity of the polyester is from 0.70 to 0.80 dL/g as determined in 60/40 (wt/wt) phenol/tetrachloroethane at a concentration of 0.25 g/50 ml at 25° C.; and
which has a haze value of less than 3%, as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 42 to about 60 mole % ethylene glycol residues; and
(ii) about 40 to about 58 mole % residues of 1,4-cyclohexanedimethanol; and
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.70 to 0.80 dL/g as determined in 60/40 (wt/wt) phenol/tetrachloroethane at a concentration of 0.25 g/50 ml at 25° C.; and
which has a haze value of less than 3%, as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting of:
(i) about 42 to about 60 mole % ethylene glycol residues; and
(ii) about 40 to about 58 mole % residues of 1,4-cyclohexanedimethanol;
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.70 to 0.80 dL/g as determined in 60/40 (wt/wt) phenol/tetrachloroethane at a concentration of 0.25 g/50 ml at 25° C.; and
which has a haze value of less than 3%, as measured by ASTM D1003, Method A.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol and neopentyl glycol or mixtures thereof;

(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of 1,4-cyclohexanedimethanol;
(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 42 to about 60 mole % ethylene glycol residues; and
(ii) about 40 to about 58 mole % residues of 1,4-cyclohexanedimethanol; and
(iii) about 2 mole % or less of diethyene glycol residues;
(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention provides comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting of:
(i) about 42 to about 60 mole % ethylene glycol residues; and
(ii) about 40 to about 58 mole % residues of 1,4-cyclohexanedimethanol;
(iii) about 2 mole % or less of diethyene glycol residues;
(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.1 to 0.6 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 42 to about 60 mole % ethylene glycol residues; and
(ii) about 40 to about 58 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.1 to 0.6 mole %;

wherein the total mole % of the dicarboxylic acid component is 100 mole %, and wherein the total mole % of the glycol component is 100 mole %; and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol and neopentyl glycol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of 1,4-cyclohexanedimethanol;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component consisting essentially of:
  (i) about 42 to about 60 mole % ethylene glycol residues; and
  (ii) about 40 to about 58 mole % residues of 1,4-cyclohexanedimethanol; and
  (iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which consists of:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of 1,4-cyclohexanedimethanol; and
  (iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 42 to about 60 mole % ethylene glycol residues; and
  (ii) about 40 to about 58 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.50 to 1.0 dL/g as determined in 60/40 (wt/wt) phenol/tetrachloroethane at a concentration of 0.25 g/50 ml at 25° C.; and a haze value of less than 3%, as measured by ASTM D1003, Method A.

In one aspect of the invention, the polyesters useful in the invention have a haze value of less than 3%, as measured by ASTM D1003, Method A.

In one aspect of the invention, the polyesters useful in the invention can have a haze value of less than 3%, as measured by ASTM D1003, Method A, on a 16 mil thick film made from the polyester.

In one aspect of the invention, the polyesters useful in the invention have a crystallization half-time from 5 minutes to 500 minutes.

In one aspect of the invention, the polyesters useful in the invention have a haze value of less than 3%, as measured by ASTM D1003, Method A. and a crystallization half-time from 5 minutes to 500 minutes.

In one aspect of the invention, the polyesters useful in the invention are post-consumer recycled.

In one aspect of the invention, diethylene glycol is present in the polyesters useful in the invention in the amount of 2 mole % or less.

In one aspect of the invention, an extrusion blow molded article is provided wherein the branching agent is present in the amount of 0.01 to 1.0 mole % based on the total mole of the polyester.

In one aspect of the invention, an extrusion blow molded article is provided wherein the branching agent is present in the amount of 0.1 to 0.6 mole % based on the total mole of the polyester.

In one aspect of the invention, the branching agent can be chosen from at least one of the following: trimellitic acid, trimellitic anhydride, trimethylolpropane, pentaerythritol, and/or trimethylolethane.

In one aspect of the invention, an extrusion blow molded article is provided wherein the difunctional glycol residues are chosen from at least one of 1,4-cyclohexanedimethanol and neopentyl glycol.

In one aspect of the invention, an extrusion blow molded article is provided wherein the difunctional glycol residues consist essentially of 1,4-cyclohexanedimethanol.

In one aspect of the invention, an extrusion blow molded article is provided wherein the difunctional glycol residues consists of 1,4-cyclohexanedimethanol.

In one aspect of the invention, an extrusion blow molded article is provided wherein the inherent viscosity of the polyester can be from 0.6 to 0.9 dL/g.

In one aspect of the invention, an extrusion blow molded article is provided wherein the inherent viscosity of the polyester can be from 0.70 to 0.80 dL/g.

In one aspect of the invention, an extrusion blow molded article is provided wherein the inherent viscosity of the polyester can be from 0.74 to 0.78 dL/g.

In all aspects of the invention, an extrusion blow molded article is provided wherein the inherent viscosity of the polyester can be from 0.5 to 0.80 dL/g.

In all aspects of the invention, an extrusion blow molded article is provided wherein the inherent viscosity of the polyester can be from 0.6 to 0.80 dL/g.

In all aspects of the invention, an extrusion blow molded article is provided wherein the polyester can be blended with at least one polymer of poly(etherimides), polyphenylene oxides, poly(phenylene oxide)/polystyrene blends, polystyrene resins, polyphenylene sulfides, polyphenylene sulfide/sulfones, poly(ester-carbonates), polycarbonates, polysulfones; polysulfone ethers, poly(ether-ketones), polyesters other than the primary ones disclosed in this invention, such as polyethylene terephthalate, and mixtures thereof.

In one embodiment, an extrusion blow molded article is provided wherein the polyester of the invention is combined with polycarbonate.

In one embodiment, an extrusion blow molded article is provided wherein the polyester of the invention is not combined with polycarbonate.

In all aspects of the invention, an extrusion blow molded article is provided wherein the polyester composition can comprise at least one additive chosen from colorants, mold release agents, phosphorus compounds, plasticizers, nucleating agents, UV stabilizers, or a mixture thereof.

In all aspects of the invention, the extrusion blow molded article can be a container.

In all aspects of the invention, the extrusion blow molded article can be a bottle.

In all aspects of the invention, the extrusion blow molded article can be a bottle with a handle.

This invention is believed to provide a transparent material which is believed to have the following advantages: of being non-problematic in the PET recycle stream, e.g., improved recyclability in the PET recycle process, low haze values, short crystallization half-times, and lack of significant stickiness to manufacturing equipment when being processed.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) of the invention/useful in the invention formed from terephthalic acid, an ester thereof, and/or mixtures thereof, ethylene glycol, and at least one difunctional glycol, and branching agents, can have a unique combination of two or more of the following properties: improved recyclability in the PET recycle process, including having a combination of one or more of low haze values, short crystallization half-times, and lack of significant stickiness to manufacturing equipment when being processed.

It is also believed that certain polyesters and/or polyester composition(s) of the invention/useful in the invention have been found to be useful in blends for extrusion blow-molding to produce transparent, noncrystalline articles such as containers which exhibit good impact strength. We have further found that pellets or flake of copolyesters comprising this composition range can be blended into ISBM PET pellets or flake at levels of up to and including 8 weight % based on the total weight of the blend without sticking or affecting the properties of the final blend when used in applications such as film, fiber, bottles and strapping.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

As used herein, the term "multifunctional" refers to functional compounds that are not mono-functional or difunctional.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 42 mole % 1,4-cyclohexanedimethanol out of a total of 100 mole % diol residues means the polyester contains 42 mole % 1,4-cyclohexanedimethanol residues out of a total of 100 mole % diol residues. Thus, there are 42 moles of 1,4-cyclohexanedimethanol residues among every 100 moles of diol residues.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl Terephthalate, or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 95 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention. Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In other aspects of the invention, the glycol component for the polyesters useful in the invention include but are not limited to at least one of the following combinations of ranges: In other aspects of the invention, the 1,4-cyclohexanedimethanol residues of the copolyesters can comprise at least one of the following ranges: from 40 to 58 mole %; from 41 to 58 mole %; from 42 to 58 mole %; from 43 to 58 mole %; from 44 to 58 mole %; from 45 to 58 mole %; from 46 to 58 mole %; from 47 to 58 mole %; from 48 to 58 mole %; from 49 to 58 mole %; from 50 to 58 mole %; from 51 to 58 mole %; from 52 to 58 mole %; from 53 to 58 mole %; from 54 to 58 mole %; from 55 to 58 mole %; from 56 to 58 mole %; from 57 to 58 mole %; from 40 to 57 mole %; from 41 to 57 mole %; from 42 to 57 mole %; from 43 to 57 mole %; from 44 to 57 mole %; from 45 to 57 mole %; from 46 to 57 mole %; from 47 to 57 mole %; from 48 to 57 mole %; from 49 to 57 mole %; from 50 to 57 mole %; from 51 to 57 mole %; from 52 to 57 mole %; from 53 to 57 mole %; from 54 to 57 mole %; from 55 to 57 mole %; from 56 to 57 mole %; from 40 to 56 mole %; from 41 to 56 mole %; from 42 to 56 mole %; from 43 to 56 mole %; from 44 to 56 mole %; from 45 to 56 mole %; from 46 to 56 mole %; from 47 to 56 mole %; from 48 to 56 mole %; from 49 to 56 mole %; from 50 to 56 mole %; from 51 to 56 mole %; from 52 to 56 mole %; from 53 to 56 mole %; from 54 to 56 mole %; from 55 to 56 mole %; from 40 to 55 mole %; from 41 to 55 mole %; from 42 to 55 mole %; from 43 to 55 mole %; from 44 to 55 mole %; from 45 to 55 mole %; from 46 to 55 mole %; from 47 to 55 mole %; from 48 to 55 mole %; from 49 to 55 mole %; from 50 to 55 mole %; from 51 to 55 mole %; from 52 to 55 mole %; from 53 to 55 mole %; from 54 to 55 mole %; from 40 to 54 mole %; from 41 to 54 mole %; from 42 to 54 mole %; from 43 to 54 mole %; from 44 to 54 mole %; from 45 to 54 mole %; from 46 to 54 mole %; from 47 to 54 mole %; from 48 to 54 mole %; from 49 to 54 mole %; from 50 to 54 mole %; from 51 to 54 mole %; from 52 to 54 mole %; from 53 to 54 mole %; from 40 to 53 mole %; from 41 to 53 mole %; from 42 to 53 mole %; from 43 to 53 mole %; from 44 to 53 mole %; from 45 to 53 mole %; from 46 to 53 mole %; from 47 to 53 mole %; from 48 to 53 mole %; from 49 to 53 mole %; from 50 to 53 mole %; from 51 to 53 mole %; from 52 to 53 mole %; from 40 to 52 mole %; from 41 to 52 mole %; from 42 to 52 mole %; from 43 to 52 mole %; from 44 to 52 mole %; from 45 to 52 mole %; from 46 to 52 mole %; from 47 to 52 mole %; from 48 to 52 mole %; from 49 to 52 mole %; from 50 to 52 mole %; from 51 to 52 mole %; from 40 to 51 mole %; from 41 to 51 mole %; from 42 to 51 mole %; from 43 to 51 mole %; from 44 to 51 mole %; from 45 to 51 mole %; from 46 to 51 mole %; from 47 to 51 mole %; from 48 to 51 mole %; from 49 to 51 mole %; from 50 to 51 mole %; from 40 to 50 mole %; from 41 to 50 mole %; from 42 to 50 mole %; from 43 to 50 mole %; from 44 to 50 mole %; from 45 to 50 mole %; from 46 to 50 mole %; from 47 to 50 mole %; from 48 to 50 mole %; from 49 to 50 mole %; from 40 to 49 mole %; from 41 to 49 mole %; from 42 to 49 mole %; from 43 to 49 mole %; from 44 to 49 mole %; from 45 to 49 mole %; from 46 to 49 mole %; from 47 to 49 mole %; from 48 to 49 mole %; from 40 to 48 mole %; from 41 to 48 mole %; from 42 to 48 mole %; from 43 to 48 mole %; from 44 to 48 mole %; from 45 to 48 mole %; from 46 to 48 mole %; from 47 to 48 mole %; from 40 to 47 mole %; from 41 to 47 mole %; from 42 to 47 mole %; from 43 to 47 mole %; from 44 to 47 mole %; from 45 to 47 mole %; from 46 to 47 mole %; from 40 to 46 mole %; from 41 to 46 mole %; from 42 to 46 mole %; from 43 to 46 mole %; from 44 to 46 mole %; from 45 to 46 mole %; from 40 to 45 mole %; from 41 to 45 mole %; from 42 to 45 mole %; from 43 to 45 mole %; from 44 to 45 mole %; from 40 to 44 mole %; from 41 to 44 mole %; from 42 to 44 mole %; from 43 to 44 mole %; from 40 to 43 mole %; from 41 to 43 mole %; from 42 to 43 mole %; from 40 to 42 mole %; and from 41 to 42 mole %.

When 1,4-cyclohexanedimethanol is employed as all or part of the glycol component, the 1,4-cyclohexanedimethanol may be cis, trans, or a mixture thereof. The molar ratio of cis/trans 1,4-cyclohexanedimethanol can vary within the range 50/50 to 0/100 or 40/60 to 20/80 or 50/50 to 100/100 or 70:30 to 30:70. In one embodiment, the 1,4-cyclohexanedimethanol has a cis/trans ratio of 60:40 to 40:60 or a cis/trans ratio of 70:30 to 30:70. In another embodiment, the trans-cyclohexanedimethanol can be present in an amount of 60 to 80 mole % and the cis-cyclohexanedimethanol can be present in an amount of 20 to 40 mole % wherein the total percentages of cis-cyclohexanedimethanol and trans-cyclohexanedimethanol is equal to 100 mole %. In particular embodiments, the trans-cyclohexanedimethanol can be present in an amount of 60 mole % and the cis-cyclohexanedimethanol can be present in an amount of 40 mole %. In particular embodiments, the trans-cyclohexanedimethanol can be present in an amount of 70 mole % and the cis-cyclohexanedimethanol can be present in an amount of 30 mole %.

In one embodiment, the glycol component of the polyester portion of the polyester compositions useful in the invention can contain up to 10 mole % of one or more modifying difunctional glycols which are not ethylene glycol, diethylene glycol, or Cyclohexanedimethanol. In one embodiment, the glycol component of the polyester portion of the polyester compositions useful in the invention can contain from 0.01 to 10 mole % of one or more modifying difunctional glycols which are not ethylene glycol, diethylene glycol, or cyclohexanedimethanol. In one embodiment, the glycol component of the polyester portion of the polyester compositions useful in the invention can contain from 0.01 to 5 mole % of one or more modifying difunctional glycols which are not ethylene glycol or cyclohexanedimethanol or diethylene glycol. In another embodiment, the polyesters useful in the invention can contain 0 mole % modifying glycols.

Modifying glycols useful in the polyesters useful in the invention refer to diols other than 1,4-cyclohexanedimethanol, diethylene glycol, and ethylene glycol and can contain 2 to 16 carbon atoms. Examples of suitable modifying glycols include, but are not limited to, 1,2-propanediol, 1,3-propanediol, neopentyl glycol, 1,4-butanediol, 1,5-pentanediol, 1,6-hexanediol, p-xylene glycol, polytetramethylene glycol, 2,2,4,4-tetramethyl-1,3-cyclobutanediol; and mixtures thereof. In another embodiment, the modifying glycols include, but are not limited to, at least one of 1,3-propanediol and 1,4-butanediol.

In one embodiment, the diethylene glycol is not added as a separate monomer but is formed during polymerization.

In certain embodiments, the polyesters useful in the invention can comprise a branching monomer, also referred to herein as a branching agent. When the polyester contains a branching agent, the branching agent can be present in an amount in the range of 0.01 to 1 mole percent or from 0.1 to 0.6 mole percent, based on the total mole percentages of either the glycol or diacid residues. In one embodiment, the branching agent can be present in the polyesters of the invention/useful in the invention in the amount of 0.01 to 10 mole percent, or from 0.01 to 5 mole percent, or from 0.01 to 1 mole percent, or from 0.05 to 5 mole percent, or from 0.05 to 1.0 mole percent, or from 0.10 to 0.25 percent, based on the total mole percentages of the glycol or diacid residues.

In certain embodiments, the copolyesters useful in this invention can comprise branching monomer residues of at least one of the following ranges: from 0.05 to 10 mole %; from 0.05 to 5 mole %; from 0.05 to 3 mole %; from 0.05 to 1.0 mole %; from 0.10 to 1.0 mole %; from 0.15 to 1.0 mole %; from 0.20 to 1.0 mole %; from 0.25 to 1.0 mole %; from 0.30 to 1.0 mole %; from 0.35 to 1.0 mole %; from 0.40 to 1.0 mole %; from 0.45 to 1.0 mole %; from 0.50 to 1.0 mole %; from 0.55 to 1.0 mole %; from 0.60 to 1.0 mole %; from 0.65 to 1.0 mole %; from 0.70 to 1.0 mole %; from 0.75 to 1.0 mole %; from 0.80 to 1.0 mole %; from 0.85 to 1.0 mole %; from 0.90 to 1.0 mole %; from 0.95 to 1.0 mole %; from 0.05 to 0.95 mole %; from 0.10 to 0.95 mole %; from 0.15 to 0.95 mole %; from 0.20 to 0.95 mole %; from 0.25 to 0.95 mole %; from 0.30 to 0.95 mole %; from 0.35 to 0.95 mole %; from 0.40 to 0.95 mole %; from 0.45 to 0.95 mole %; from 0.50 to 0.95 mole %; from 0.55 to 0.95 mole %; from 0.60 to 0.95 mole %; from 0.65 to 0.95 mole %; from 0.70 to 0.95 mole %; from 0.75 to 0.95 mole %; from 0.80 to 0.95 mole %; from 0.85 to 0.95 mole %; from 0.90 to 0.95 mole %; from 0.05 to 0.90 mole %; from 0.10 to 0.90 mole %; from 0.15 to 0.90 mole %; from 0.20 to 0.90 mole %; from 0.25 to 0.90 mole %; from 0.30 to 0.90 mole %; from 0.35 to 0.90 mole %; from 0.40 to 0.90 mole %; from 0.45 to 0.90 mole %; from 0.50 to 0.90 mole %; from 0.55 to 0.90 mole %; from 0.60 to 0.90 mole %; from 0.65 to 0.90 mole %; from 0.70 to 0.90 mole %; from 0.75 to 0.90 mole %; from 0.80 to 0.90 mole %; from 0.85 to 0.90 mole %; from 0.05 to 0.85 mole %; from 0.10 to 0.85 mole %; from 0.15 to 0.85 mole %; from 0.20 to 0.85 mole %; from 0.25 to 0.85 mole %; from 0.30 to 0.85 mole %; from 0.35 to 0.85 mole %; from 0.40 to 0.85 mole %; from 0.45 to 0.85 mole %; from 0.50 to 0.85 mole %; from 0.55 to 0.85 mole %; from 0.60 to 0.85 mole %; from 0.65 to 0.85 mole %; from 0.70 to 0.85 mole %; from 0.75 to 0.85 mole %;

from 0.80 to 0.85 mole %; from 0.05 to 0.80 mole %; from 0.10 to 0.80 mole %; from 0.15 to 0.80 mole %; from 0.20 to 0.80 mole %; from 0.25 to 0.80 mole %; from 0.30 to 0.80 mole %; from 0.35 to 0.80 mole %; from 0.40 to 0.80 mole %; from 0.45 to 0.80 mole %; from 0.50 to 0.80 mole %; from 0.55 to 0.80 mole %; from 0.60 to 0.80 mole %; from 0.65 to 0.80 mole %; from 0.70 to 0.80 mole %; from 0.75 to 0.80 mole %; from 0.05 to 0.75 mole %; from 0.10 to 0.75 mole %; from 0.15 to 0.75 mole %; from 0.20 to 0.75 mole %; from 0.25 to 0.75 mole %; from 0.30 to 0.75 mole %; from 0.35 to 0.75 mole %; from 0.40 to 0.75 mole %; from 0.45 to 0.75 mole %; from 0.50 to 0.75 mole %; from 0.55 to 0.75 mole %; from 0.60 to 0.75 mole %; from 0.65 to 0.75 mole %; from 0.70 to 0.75 mole %; from 0.05 to 0.70 mole %; from 0.10 to 0.70 mole %; from 0.15 to 0.70 mole %; from 0.20 to 0.70 mole %; from 0.25 to 0.70 mole %; from 0.30 to 0.70 mole %; from 0.35 to 0.70 mole %; from 0.40 to 0.70 mole %; from 0.45 to 0.70 mole %; from 0.50 to 0.70 mole %; from 0.55 to 0.70 mole %; from 0.60 to 0.70 mole %; from 0.65 to 0.70 mole %; from 0.05 to 0.65 mole %; from 0.10 to 0.65 mole %; from 0.15 to 0.65 mole %; from 0.20 to 0.65 mole %; from 0.25 to 0.65 mole %; from 0.30 to 0.65 mole %; from 0.35 to 0.65 mole %; from 0.40 to 0.65 mole %; from 0.45 to 0.65 mole %; from 0.50 to 0.65 mole %; from 0.55 to 0.65 mole %; from 0.60 to 0.65 mole %; from 0.05 to 0.60 mole %; from 0.10 to 0.60 mole %; from 0.15 to 0.60 mole %; from 0.20 to 0.60 mole %; from 0.25 to 0.60 mole %; from 0.30 to 0.60 mole %; from 0.35 to 0.60 mole %; from 0.40 to 0.60 mole %; from 0.45 to 0.60 mole %; from 0.50 to 0.60 mole %; from 0.55 to 0.60 mole %; from 0.05 to 0.55 mole %; from 0.10 to 0.55 mole %; from 0.15 to 0.55 mole %; from 0.20 to 0.55 mole %; from 0.25 to 0.55 mole %; from 0.30 to 0.55 mole %; from 0.35 to 0.55 mole %; from 0.40 to 0.55 mole %; from 0.45 to 0.55 mole %; from 0.50 to 0.55 mole %; from 0.05 to 0.50 mole %; from 0.10 to 0.50 mole %; from 0.15 to 0.50 mole %; from 0.20 to 0.50 mole %; from 0.25 to 0.50 mole %; from 0.30 to 0.50 mole %; from 0.35 to 0.50 mole %; from 0.40 to 0.50 mole %; from 0.45 to 0.50 mole %; from 0.05 to 0.45 mole %; from 0.10 to 0.45 mole %; from 0.15 to 0.45 mole %; from 0.20 to 0.45 mole %; from 0.25 to 0.45 mole %; from 0.30 to 0.45 mole %; from 0.35 to 0.45 mole %; from 0.40 to 0.45 mole %; from 0.05 to 0.40 mole %; from 0.10 to 0.40 mole %; from 0.15 to 0.40 mole %; from 0.20 to 0.40 mole %; from 0.25 to 0.40 mole %; from 0.30 to 0.40 mole %; from 0.35 to 0.40 mole %; from 0.05 to 0.35 mole %; from 0.10 to 0.35 mole %; from 0.15 to 0.35 mole %; from 0.20 to 0.35 mole %; from 0.25 to 0.35 mole %; from 0.30 to 0.35 mole %; from 0.05 to 0.30 mole %; from 0.10 to 0.30 mole %; from 0.15 to 0.30 mole %; from 0.20 to 0.30 mole %; from 0.25 to 0.30 mole %; from 0.05 to 0.25 mole %; from 0.10 to 0.25 mole %; from 0.15 to 0.25 mole %; from 0.20 to 0.25 mole %; from 0.05 to 0.20 mole %; from 0.10 to 0.20 mole %; from 0.15 to 0.20 mole %; from 0.05 to 0.15 mole %; from 0.10 to 0.15 mole %; and from 0.05 to 0.10 mole %.

In other embodiments of the invention, the copolyesters useful in this invention can comprise branching monomer residues of at least one of the following ranges: from 1.0 to 5.0 mole %; from 1.0 to 4.0 mole %; from 1.0 to 3.0 mole %; from 1.0 to 2.0 mole %; from 2.0 to 5.0 mole %; from 2.0 to 4.0 mole %; from 2.0 to 3.0 mole %; from 3.0 to 5.0 mole %; from 3.0 to 4.0 mole %; and from 4.0 to 5.0 mole %.

In one embodiment of the invention, the branching monomer can have 3 or more carboxyl substituents, hydroxyl substituents, or a combination thereof.

Illustrative of certain branching agents useful in the invention are polyfunctional acids, polyfunctional glycols and acid/glycol hybrids. Examples of multifunctional acids and multifunctional alcohols include tri or tetracarboxylic acids, such as trimesic acid, trimellitic acid, citric acid, tartaric acid, 3-hydroxyglutaric acid and pyromellitic acid and lower alkyl esters thereof and the like, and tetrols such as pentaerythritol. Also triols such as trimethylolpropane or dihydroxy carboxylic acids and hydroxydicarboxylic acids and derivatives, such as dimethyl hydroxy terephthalate, and the like are useful within the context of this invention. In one embodiment of the invention, trimellitic anhydride is the branching agent. The branching monomer may be added to the polyester reaction mixture or blended with the polyester in the form of a concentrate as described, for example, in U.S. Pat. Nos. 5,654, 347 and 5,696,176, whose disclosure regarding branching monomers is incorporated herein by reference. The branching agents may be used either to branch the copolyester itself or to branch the copolyester/PET blend of the invention.

In one embodiment, the branching monomer residues are chosen from at least one of the following: trimellitic anhydride, pyromellitic dianhydride, glycerol, sorbitol, 1,2,6-hexanetriol, pentaerythritol, trimethylolethane, or trimesic acid.

In one embodiment, the branching monomer residues comprise about 0.10 to about 0.25 mole percent of one or more residues of: trimellitic anhydride, pyromellitic dianhydride, glycerol, sorbitol, 1,2,6-hexanetriol, pentaerythritol, trimethylolethane, or trimesic acid.

In one embodiment, the branching monomer or agent can be added add any time during the polymerization of the polyester.

In certain embodiments, the polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 to about 10% by weight, or about 0.1 to about 5% by weight, based on the total weight of the polyester.

For certain embodiments of the invention, the Tg of the copolyesters useful in the invention can be at least one of the following ranges: 75 to 95° C.; 75 to 94° C.; 75 to 93° C.; 75 to 92° C.; 75 to 91° C.; 75 to 90° C.; 75 to 89° C.; 75 to 88° C.; 75 to 87° C.; 75 to 86° C.; 75 to 85° C.; 75 to 84° C.; 75 to 83° C.; 75 to 82° C.; 75 to 81° C.; 75 to 80° C., 75 to 79° C.; 75 to 78° C.; 75 to 77° C.; 75 to 76° C.; 76 to 96° C.; 76 to 94° C.; 76 to 93° C.; 76 to 92° C.; 76 to 91° C.; 76 to 90° C.; 76 to 89° C.; 76 to 88° C.; 76 to 87° C.; 76 to 86° C.; 76 to 85° C.; 76 to 84° C.; 76 to 83° C.; 76 to 82° C.; 76 to 81° C.; 76 to 80° C.; 76 to 79° C.; 76 to 78° C.; 76 to 77° C.; 77 to 95° C.; 77 to 94° C.; 77 to 93° C.; 77 to 92° C.; 77 to 91° C.; 77 to 90° C.; 77 to 89° C.; 77 to 88° C.; 77 to 87° C.; 77 to 86° C.; 77 to 85° C.; 77 to 84° C.; 77 to 83° C.; 77 to 82° C.; 77 to 81° C.; 77 to 80° C., 77 to 79° C.; 77 to 78° C.; 78 to 95° C.; 78 to 94° C.; 78 to 93° C.; 78 to 92° C.; 78 to 91° C.; 78 to 90° C.; 78 to 89° C.; 78 to 88° C.; 78 to 87° C.; 78 to 86° C.; 78 to 85° C.; 78 to 84° C.; 78 to 83° C.; 78 to 82° C.; 78 to 81° C.; 78 to 80° C.; 78 to 79° C.; 79 to 95° C.; 79 to 94° C.; 79 to 93° C.; 79 to 92° C.; 79 to 91° C.; 79 to 90° C.; 79 to 89° C.; 79 to 88° C.; 79 to 87° C.; 79 to 86° C.; 79 to 85° C.; 79 to 84° C.; 79 to 83° C.; 79 to 82° C.; 79 to 81° C.; 79 to 80° C., 80 to 95° C.; 80 to 94° C.; 80 to 93° C.; 80 to 92° C.; 80 to 91° C.; 80 to 90° C.; 80 to 89° C.; 80 to 88° C.; 80 to 87° C.; 80 to 86° C.; 80 to 85° C.; 80 to 84° C.; 80 to 83° C.; 80 to 82° C.; 80 to 81° C.; 81 to 95° C.; 81 to 94° C.; 81 to 93° C.; 81 to 92° C.; 81 to 91° C.; 81 to 90° C.; 81 to 89° C.; 81 to 88° C.; 81 to 87° C.; 81 to 86° C.; 81 to 85° C.; 81 to 84° C.; 81 to 83° C.; 81 to 82° C.; 82 to 95° C.; 82 to 94° C.; 82 to 93° C.; 82 to 92° C.; 82 to 91° C.; 82 to 90° C.; 82 to 89° C.; 82 to 88° C.; 82 to 87° C.; 82 to 86° C.; 82 to 85° C.; 82 to 84° C.; 82 to 83° C.; 83 to 95° C.; 83 to 94° C.; 83 to 93° C.; 83 to 92° C.; 83 to 91° C.; 83 to 90° C.; 83 to 89° C.; 83 to 88° C.; 83 to 87° C.; 83 to 86° C.; 83 to 85° C.; 83 to 84° C.; 84 to 95° C.; 84 to 94° C.; 84 to 93° C.; 84 to 92° C.; 84 to 91° C.; 84 to 90° C.; 84 to 89° C.; 84 to 88° C.; 84 to 87° C.; 84 to 86° C.; 84 to 85° C.; 85 to 95° C.; 85 to 94° C.; 85 to 93° C.; 85 to 92° C.; 85 to 91° C.; 85 to 90° C.; 85 to 89° C.; 85 to 88° C.; 85 to 87° C.; 85 to 86° C.; 86 to 95° C.; 86 to 94° C.; 86 to 93° C.; 86 to 92° C.; 86 to 91° C.; 86 to 90° C.; 86 to 89° C.; 86 to 88° C.; 86 to 87° C.; 87 to 95° C.; 87 to 94° C.; 87 to 93° C.; 87 to 92° C.; 87 to 91° C.; 87 to 90° C.; 87 to 89° C.; 87 to 88° C.; 88 to 95° C.; 88 to 94° C.; 88 to 93° C.; 88 to 92° C.; 88 to 91° C.; 88 to 90° C.; 88 to 89° C.; 89 to 95° C.; 89 to 94° C.; 89 to 93° C.; 89 to 92° C.; 89 to 91° C.; 89 to 90° C.; 90 to 95° C.; 90 to 94° C.; 90 to 93° C.; 90 to 92° C.; 90 to 91° C.; 91 to 95° C.; 91 to 94° C.; 91 to 93° C.; 91 to 92° C.; 92 to 95° C.; 92 to 94° C.; 92 to 93° C.; 93 to 95° C.; 93 to 94° C.; and 94 to 95° C. The glass transition temperature (Tg) of the polyesters useful in the invention was determined using a TA DSC 2920 from Thermal Analyst Instrument at a scan rate of 20° C./min.

For certain embodiments of the invention, the copolyesters useful in the invention may exhibit at least one of the following inherent viscosities as determined in 60/40 (wt/wt) phenol/tetrachloroethane at a concentration of 0.5 g/100 ml at 25° C.: 0.50 to 1.0 dl/g; 0.50 to less than 1 dl/g; 0.50 to 0.95 dl/g; 0.50 to 0.90 dl/g; 0.50 to 0.85 dl/g; 0.50 to 0.80 dl/g; 0.50 to less than 0.80 dl/g; 0.50 to 0.75 dl/g; 0.50 to 0.70 dl/g; 0.50 to less than 0.70 dl/g; 0.50 to 0.65 dl/g; 0.50 to 0.60 dl/g; 0.50 to 0.55 dl/g; 0.55 to 1 dl/g; 0.55 to less than 1 dl/g; 0.55 to 0.95 dl/g; 0.55 to 0.90 dl/g; 0.55 to 0.85 dl/g; 0.55 to 0.80 dl/g; 0.55 to less than 0.80 dl/g; 0.55 to 0.75 dl/g; 0.55 to 0.70 dl/g; 0.55 to less than 0.70 dl/g; 0.55 to 0.65 dl/g; 0.55 to 0.60 dl/g; 0.60 to 1 dl/g; 0.60 to less than 1 dl/g; 0.60 to 0.95 dl/g; 0.60 to 0.90 dl/g; 0.60 to 0.85 dl/g; 0.60 to 0.80 dl/g; 0.60 to less than 0.80 dl/g; 0.60 to 0.75 dl/g; 0.60 to 0.70 dl/g; 0.60 to less than 0.70 dl/g; 0.60 to 0.65 dl/g; 0.65 to 1 dl/g; 0.65 to less than 1 dl/g; 0.65 to 0.95 dl/g; 0.65 to 0.90 dl/g; 0.65 to 0.85 dl/g; 0.65 to less than 0.80 dl/g; 0.65 to 0.80 dl/g; 0.65 to 0.75 dl/g; 0.65 to 0.70 dl/g; 0.70 to 1 dl/g; 0.70 to less than 1 dl/g; 0.70 to 0.95 dl/g; 0.70 to 0.90 dl/g; 0.70 to 0.85 dl/g; 0.70 to 0.80 dl/g; 0.70 to less than 0.80 dl/g; greater than 0.50 to 1.0 dl/g; greater than 0.50 to less than 1 dl/g; greater than 0.50 to 0.95 dl/g; greater than 0.50 to 0.90 dl/g; greater than 0.50 to 0.85 dl/g; greater than 0.50 to 0.80 dl/g; greater than 0.50 to less than 0.80 dl/g; greater than 0.50 to 0.75 dl/g; greater than 0.50 to less than 0.70 dl/g; greater than 0.50 to 0.70 dl/g; greater than 0.50 to 0.65 dl/g, greater than 0.50 to 0.60 dl/g, and greater than 0.50 to less than 0.60 dl/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the Tg ranges described herein and at least one of the monomer ranges for the compositions described herein unless otherwise stated. It is also contemplated that compositions useful in the invention can possess at least one of the inherent viscosity ranges described herein, at least one of the Tg ranges described herein, and at least one of the monomer ranges for the compositions described herein unless otherwise stated.

It is also contemplated that the copolyesters and blends of the invention can possess any combination of at least one of the glycol, diacid, and branching agent composition ranges described herein, PET composition ranges, at least one of the Tg ranges described herein, at least one of the inherent viscosity ranges described herein, at least one of the crystallization half times described herein, and/or at least one of the haze values described herein.

In one embodiment, certain polyesters useful in this invention can be visually clear. The term "visually clear" is defined herein as an appreciable absence of cloudiness, haziness, and/or muddiness, when inspected visually. In another embodiment, when the polyesters are blended with polyethylene terephthalate, the blends can be visually clear.

In one embodiment, the articles of the invention have a haze value of less than 3% as measured by ASTM D1003, Method A.

In one embodiment, the articles of the invention have a crystallization half-time from 5 minutes to 500 minutes Because of the crystallization half-times (e.g., greater than 5 minutes but less than 500 minutes) at 160° C. exhibited by certain copolyesters useful in the present invention, the blends of the invention will not stick in a dryer at 160° C.

Because of the short crystallization half-times (e.g., greater than 5 minutes but less than 500 minutes) at 160° C. exhibited by certain copolyesters useful in the present invention, it is possible to produce extrusion blow molded shaped articles. Examples of extrusion blow molded shaped articles that can be made with the compositions according to the invention include handleware containers of a relatively large volume such as, for example, handleware containers having volumes of 1.5, 1.7, 3, 5, and 7 liters. It is also possible to make other articles from the compositions according to the invention including films, fibers, and strapping. The copolyesters of the invention can be amorphous or semicrystalline. In one aspect, certain copolyesters useful in the invention can have relatively low crystallinity. Certain copolyesters useful in the invention can thus have a substantially amorphous morphology, meaning that the copolyesters comprise substantially unordered regions of polymer.

In one embodiment, an "amorphous" copolyester can have a crystallization half-time of greater than 5 minutes at 160° C. or greater than 10 minutes at 160° C. or greater than 50 minutes at 160° C. or greater than 100 minutes at 160° C. In one embodiment of the invention, a copolyester of the invention may exhibit at least one of the following crystallization half times: less than 500 minutes at 160° C., less than 400 minutes at 160° C., less than 300 minutes at 160° C., less than 240 minutes at 160° C., less than 200 minutes at 160° C., and less than 100 minutes at 160° C. In one embodiment, the molded objects of the invention have a crystallization half-time from the glass phase of greater than 5 minutes and less than 500 minutes when measured at 160° C. The crystallization half time of the copolyester, as used herein, may be measured using methods well-known to persons of skill in the art. For example, the crystallization half-time, t½, may be determined by measuring the light transmission of a sample via a laser and photo detector as a function of time on a temperature controlled hot stage. This measurement can be done by melting the sample to remove any existing crystallinity, and then quenching the sample to room temperature. The sample is then placed on a fixture preheated to the temperature of interest and the sample is held at this temperature while transmission measurements are made as a function of time. Next, the transmitted light intensity is recorded plotted versus time. The crystallization half-time is recorded as the time at which the light transmission is halfway between the initial transmission and the maximum transmission.

The copolyesters and blends of the invention also display suitable haze values for bottle applications, as measured on 16 mil thick films using a BYK-Gardner HazeGuard Plus Spectrophotometer according to ASTM D1003, Method A. Examples of suitable haze values include 3% or lower, 2% or lower, and 1% or lower.

The polyesters useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

In one embodiment, certain polyesters useful in the invention can exhibit a melt viscosity greater than 20,000 poise, preferably greater than 30,000 poise, when measured at 240° C. and 1 rad/sec using a rotary viscometer such as a Rheometrics Dynamic Analyzer (RDA II).

In another aspect, this invention relates to a process for preparing extrusion blow molded articles of the invention.

This invention intends to include any extrusion blow molding manufacturing process known in the art. Although not limited thereto, a typical description of extrusion blow molding manufacturing process involves: 1) melting the resin in an extruder; 2) extruding the molten resin through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

The hot parison that is extruded in this process often must hang for several seconds under its own weight prior to the mold being clamped around it. During this time, the extrudate must have good molten dimensional stability, also known as melt strength. Melt strength is directly related to the viscosity of the material. A material with good melt strength (i.e. high viscosity) can resist stretching and flowing (a.k.a. sag) that would cause uneven material distribution in the parison and thinning of the parison walls. The sag of the extruded parison is directly related to the weight of the parison, whereby larger and heavier parisons will have a greater tendency to sag. Heavier parisons can be required as bottle size increases, whereby the production of larger bottles requires higher melt strength. Materials with high melt strength will also resist tearing while the parison is blown into a bottle. Thus, good melt strength is required to form good quality containers, particularly those of larger size, that have uniform side wall thickness and that will not tear during expansion (i.e. blowing).

The two types of extrusion blow molding that involve a hanging parison are referred to as "shuttle" and "intermittent" processes. In a shuttle process, the mold is situated on a moving platform that moves the mold up to the extruder die, closes it around the parison while cutting off a section, and then moves away from the die to inflate, cool and eject the bottle. Due to the mechanics of this process, the polymer is continuously extruded through the die at a relatively slow rate. By contrast, the mold in an intermittent process is fixed below the die opening and the full shot weight (the weight of the bottle plus flash) of polymer must be rapidly pushed through the die after the preceding bottle is ejected but before the current bottle is inflated. Intermittent processes can either utilize a reciprocating screw action to push the parison, or the extrudate can be continuously extruded into a cavity which utilizes a plunger to push the parison.

In a very different type of extrusion blow molding process, a 4-20 ft diameter wheel moving at 1-10 revolutions per minute grabs the parison as it extrudes from the die and lays it in molds attached to the wheel's outer circumference. Mold close, parison inflation, cooling and ejection of the bottle occurs sequentially as the wheel turns. In this "wheel process", the parison is actually pulled from the die by the wheel whereby good melt strength is required to prevent thinning of the parison during both pulling as well as subsequent blowing. The parison in a wheel process can exit the die in either an upward or downward direction and melt strength will be more crucial during upward extrusion due to the effects of gravity. Because of the continuous nature of this "wheel" process, polymer can be extruded from the die at very high speeds.

In other aspects of the invention, the compositions useful in this invention can be blended with ISBM polyethylene terephthalate compositions in at least one of the following ranges (wt % refers to weight %): from 0.1 to 8 wt %; from 0.5 to 8 wt %; from 1.0 to 8 wt %; from 1.5 to 8 wt %; from 2.0 to 8 wt %; from 2.5 to 8 wt %; from 3.0 to 8 wt %; from 3.5 to 8 wt %; from 4.0 to 8 wt %; from 4.5 to 8 wt %; from 5.0 to 8 wt %; from 5.5 to 8 wt %; from 6.0 to 8 wt %; from 6.5 to 8 wt %; from 7.0 to 8 wt %; from 7.5 to 8 wt %; from 0.1 to 7.5 wt %; from 0.5 to 7.5 wt %; from 1.0 to 7.5 wt %; from 1.5 to 7.5 wt %; from 2.0 to 7.5 wt %; from 2.5 to 7.5 wt %; from 3.0 to 7.5 wt %; from 3.5 to 7.5 wt %; from 4.0 to 7.5 wt %; from 4.5 to 7.5 wt %; from 5.0 to 7.5 wt %; from 5.5 to 7.5 wt %; from 6.0 to 7.5 wt %; from 6.5 to 7.5 wt %; from 7.0 to 7.5 wt %; from 0.1 to 7.0 wt %; from 0.5 to 7.0 wt %; from 1.0 to 7.0 wt %; from 1.5 to 7.0 wt %; from 2.0 to 7.0 wt %; from 2.5 to 7.0 wt %; from 3.0 to 7.0 wt %; from 3.5 to 7.0 wt %; from 4.0 to 7.0 wt %; from 4.5 to 7.0 wt %; from 5.0 to 7.0 wt %; from 5.5 to 7.0 wt %; from 6.0 to 7.0 wt %; from 6.5 to 7.0 wt %; from 0.1 to 6.5 wt %; from 0.5 to 6.5 wt %; from 1.0 to 6.5 wt %; from 1.5 to 6.5 wt %; from 2.0 to 6.5 wt %; from 2.5 to 6.5 wt %; from 3.0 to 6.5 wt %; from 3.5 to 6.5 wt %; from 4.0 to 6.5 wt %; from 4.5 to 6.5 wt %; from 5.0 to 6.5 wt %; from 5.5 to 6.5 wt %; from 6.0 to 6.5 wt %; from 0.1 to 6.0 wt %; from 0.5 to 6.0 wt %; from 1.0 to 6.0 wt %; from 1.5 to 6.0 wt %; from 2.0 to 6.0 wt %; from 2.5 to 6.0 wt %; from 3.0 to 6.0 wt %; from 3.5 to 6.0 wt %; from 4.0 to 6.0 wt %; from 4.5 to 6.0 wt %; from 5.0 to 6.0 wt %; from 5.5 to 6.0 wt %; from 0.1 to 5.5 wt %; from 0.5 to 5.5 wt %; from 1.0 to 5.5 wt %; from 1.5 to 5.5 wt %; from 2.0 to 5.5 wt %; from 2.5 to 5.5 wt %; from 3.0 to 5.5 wt %; from 3.5 to 5.5 wt %; from 4.0 to 5.5 wt %; from 4.5 to 5.5 wt %; from 5.0 to 5.5 wt %; from 0.1 to 5.0 wt %; from 0.5 to 5.0 wt %; from 1.0 to 5.0 wt %; from 1.5 to 5.0 wt %; from 2.0 to 5.0 wt %; from 2.5 to 5.0 wt %; from 3.0 to 5.0 wt %; from 3.5 to 5.0 wt %; from 4.0 to 5.0 wt %; from 4.5 to 5.0 wt %; from 0.1 to 4.5 wt %; from 0.5 to 4.5 wt %; from 1.0 to 4.5 wt %; from 1.5 to 4.5 wt %; from 2.0 to 4.5 wt %; from 2.5 to 4.5 wt %; from 3.0 to 4.5 wt %; from 3.5 to 4.5 wt %; from 4.0 to 4.5 wt %; from 0.1 to 4.0 wt %; from 0.5 to 4.0 wt %; from 1.0 to 4.0 wt %; from 1.5 to 4.0 wt %; from 2.0 to 4.0 wt %; from 2.5 to 4.0 wt %; from 3.0 to 4.0 wt %; from 3.5 to 4.0 wt %; from 0.1 to 3.5 wt %; from 0.5 to 3.5 wt %; from 1.0 to 3.5 wt %; from 1.5 to 3.5 wt %; from 2.0 to 3.5 wt %; from 2.5 to 3.5 wt %; from 3.0 to 3.5 wt %; from 0.1 to 3.0 wt %; from 0.5 to 3.0 wt %; from 1.0 to 3.0 wt %; from 1.5 to 3.0 wt %; from 2.0 to 3.0 wt %; from 2.5 to 3.0 wt %; from 0.1 to 2.5 wt %; from 0.5 to 2.5 wt %; from 1.0 to 2.5 wt %; from 1.5 to 2.5 wt %; from 2.0 to 2.5 wt %; from 0.1 to 2.0 wt %; from 0.5 to 2.0 wt %; from 1.0 to 2.0 wt %; from 1.5 to 2.0 wt %; from 0.1 to 1.5 wt %; from 0.5 to 1.5 wt %; from 1.0 to 1.5 wt %; from 0.1 to 1.0 wt %; from 0.5 to 1.0 wt %; and from 0.1 to 0.5 wt %, based on the total weight of the blend.

In addition, the polyester compositions and the polymer blend compositions useful in the invention may also contain any amount of at least one additive, for example, from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In addition, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toner(s) can be added to the esterification zone or to the polycondensation zone. Preferably, the toner(s) are added to the esterification zone or to the early stages of the polycondensation zone, such as to a prepolymerization reactor.

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric, and "wt" refers to weight.

EXAMPLES

The following abbreviations are used throughout the examples that follow:

| | |
|---|---|
| CHDM | 1,4-cyclohexanedimethanol |
| DMT | Dimethyl therephthalate |
| DEG | Diethylene glycol |
| EG | Ethylene glycol |
| IV | Inherent viscosity |
| $T_g$ | Glass transition temperature |

-continued

| | |
|---|---|
| TPA | Terephthalic acid |
| PCR | Post-Consumer Recycle |

The copolyesters of our invention may be prepared using procedures well-known in the art for the preparation of high molecular weight polyesters. For example, the copolyesters may be prepared by direct condensation using a dicarboxylic acid or by ester interchange using a dialkyl dicarboxylate. Thus, a dialkyl terephthalate such as dimethyl terephthalate is ester interchanged with the diols at elevated temperatures in the presence of a catalyst. Polycondensation is carried out at increasing temperatures and at reduced pressures until a copolyester having the desired inherent viscosity is obtained. All pellets were amorphous as they emerged from the reactor.

Compositions of the polymers used in the examples were measured by proton nuclear magnetic resonance (NMR) spectroscopy. All NMR spectra were recorded on a JEOL Eclipse Plus 600 MHz nuclear magnetic resonance spectrometer using chloroform-trifluoroacetic acid (70-30 volume/volume).

The inherent viscosity of the polyesters was determined in 60/40 (wt/wt) phenol/tetrachloroethane at a concentration of 0.5 g/100 ml at 25° C.

Unless stated otherwise, the glass transition temperature (Tg) was determined using a TA DSC 2920 instrument from Thermal Analyst Instruments at a scan rate of 20° C./min according to ASTM D3418.

Haze was measured on 16 mil thick films using a BYK-Gardner HazeGuard Plus Spectrophotometer according to ASTM D1003, Method A.

The glycol content of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40(wt/wt) phenol/tetrachloroethane with deuterated chloroform added for lock. Peak assignments for 1,4-cyclohexanedimethanol and ethylene glycol were made by comparison to accepted model compounds. These model compounds closely approximate the resonance positions found in the polymers and oligomers.

The crystallization half-time, t½, was determined by measuring the light transmission of a sample via a laser and photo detector as a function of time on a temperature controlled hot stage. This measurement was done by melting the sample to remove any existing crystallinity, and then quenching the sample to room temperature. The sample was then placed on a fixture preheated to the temperature of interest and the sample was held at this temperature while transmission measurements were made as a function of time. Next, the transmitted light intensity was recorded plotted versus time. The crystallization half-time was recorded as the time at which the light transmission was halfway between the initial transmission and the maximum transmission.

These examples show how copolyester compositions with CHDM contents outside the scope of the invention can cause excessive sticking in a dryer and/or form clumps when blended into ISBM PET container flake.

Example Composition A was prepared using 100% dimethyl terephthalate as the dialkyl dicarboxylate moiety and a mixture of 50 mole percent ethylene glycol and 50 mole percent cyclohexane dimethanol. The material also contained 0.175 weight percent trimellitic acid moiety. The melt viscosity at 240° C. at 1 rad/sec was 47,000 poise.

Comparative Composition B was prepared using 100% dimethyl terephthalate as the dialkyl dicarboxylate moiety and a mixture of 69 mole percent ethylene glycol and 31 mole percent cyclohexane dimethanol. The material also contained 0.175 weight percent trimellitic acid moiety.

Comparative Composition C was prepared using 100% dimethyl terephthalate as the dialkyl dicarboxylate moiety and a mixture of 38 mole percent ethylene glycol and 62 mole percent cyclohexane dimethanol. The material also contained 0.175 weight percent trimellitic acid moiety.

In Examples 1 and 2 and Comparative Examples 3 and 4 either 0.5 lbs (1 wt %) or 2.5 lbs (5 wt %) of Example Composition A or Comparative Composition B were dry blended with additional commercially available PET PCR to make up a 50 lb batch. Each batch was added to a 5 cubic foot rotary vacuum dryer set at 170° C. The flake was tumbled for 4 hours. The flake reached a temperature of 160° C. after one hour and stayed at that temperature. After four hours, the dryer was cooled and the material dumped. The inside of the chamber was examined. No flake was stuck to the walls in the runs using flake containing Example Composition A. By contrast, the walls were well coated with flake in the runs using flake containing Comparative Composition B. The remaining material was sieved through a 0.36" hole size mesh to remove clumps and the clumped material was weighed. The combined weight of the stuck and clumped material was subtracted from the original charge weight (50 lbs) to calculate the total % adhered. The data below shows that Comparative Composition B caused significant sticking, enough to be a problem in the PET recycle stream. However, flake containing both 1 and 5% of Example Composition A could be added to PET without any sticking issues.

TABLE 1

| Example | Wt % material in PET PCR | Total % Adhered |
|---|---|---|
| 1 | 1% A | 0.0% |
| 2 | 5% A | 0.0% |
| C3 | 1% B | 3.4% |
| C4 | 5% B | 10.1% |

Examples 5-11

The following examples show how copolyester compositions with CHDM contents above 58 mole percent can cause undesirable haze when blended into PET. Pellets of a typical ISBM bottle grade PET (CB12 from Eastman Chemical Company) were dry blended with pellets of either Example Composition A or Comparative Composition C in the amounts shown. These blends were first extruded into pellets on a Sterling 1.25" single screw extruder and then redried and extruded into 16 mil thick films on a Killian 1" extruder. Example C5 shows the base haze for the extruded CB12 film. Examples 6-9 show that Example Composition A can be added into CB12 without producing a visually noticeable change in haze values. Comparative Example C10 shows that adding 10% of Example Composition A to CB12 produces noticeable haze. Haze values below 3% in films of this thickness can not be detected visually. The standard deviation of this measurement is 0.2%. By contrast, Comparative Example C11 shows that adding only 5% of Comparative Composition C to CB12 produces noticeable haze. If Comparative Composition C was used to produce containers, these containers would not be compatible with PET in the PET recycle stream.

TABLE 2

| Example | wt % CB12 | wt % other | Pellet IV | Film IV | Haze (%) |
|---|---|---|---|---|---|
| C5 | 100% | none | 0.711 | 0.65 | 1.08 |
| 6 | 99.5 | 0.5% A | 0.708 | 0.652 | 1.10 |
| 7 | 99 | 1% A | 0.704 | 0.645 | 1.32 |
| 8 | 98 | 2% A | 0.709 | 0.631 | 1.04 |
| 9 | 95 | 5% A | 0.704 | 0.658 | 1.63 |
| C10 | 90 | 10% A | 0.717 | 0.653 | 4.61 |
| C11 | 95 | 5% C | 0.702 | 0.655 | 4.02 |

Example 12

This example illustrates how shaped articles can be made and prepared from the blends of the invention. 1.74 liter handleware containers were prepared from Example Composition A using an 80 mm Bekum H-121 continuous extrusion blow molding machine fitted with a barrier screw. The materials were dried for 12 hours at 65° C. prior to extrusion. The temperature of the extruded parison was measured by a melt probe to be 230° C. While 1.74 liter handleware containers were prepared in this example, containers of a larger volume are also within the scope of this invention, such as, for example, 3, 5, and 7 liter handleware containers.

Example 13

This example shows how the crystallization half-time of Example Composition A, Comparative Composition B, and Comparative Composition C, as prepared in Examples 1-4. Table 3 shows the crystallization halftimes from the glass phase of the three compositions measured at 160° C. While both Example Composition A and Comparative Composition C have acceptable crystallization half-times when measured at 160° C., Comparative Composition C produces noticeable haze as shown in Example C11 and containers made from Comparative Composition C would not be compatible with PET in the PET recycle stream.

TABLE 3

| Composition | Crystallization half-time |
|---|---|
| A | 487 minutes |
| B | >2000 minutes |
| C | 51 minutes |

Examples 14 and 15

In examples 14 and 15, dryer testing to assess the effect sticking on flake flow rate was done by granulating these bottles and mixing the flake with commercially available food-grade PET PCR (post-consumer recycle) flake obtained from United Resources Recovery Corporation. The dryer test apparatus consisted of a 1000-lb capacity hopper dryer equipped with a desiccant unit and two Conair DB12 vacuum loaders. One loader sat atop the hopper and was operated so that the hopper remained full of flake for the duration of the test. The second loader was connected to the hopper outlet via a 1.75-in diameter flexible hose and a metal air inlet tube such as is used in commercial airveying processes for pellets or flake. The second loader's intermittent suction time was set so that flake was airveyed from the hopper at a nominal rate of 160 lb/hr, which gave an approximate hopper residence time of 3 to 4 hours. The test procedure began with filling the hopper with PET PCR flake and drying for 6 hours at 160 C. The dryer was operated at 160 C for the duration of the test. The second vacuum loader was then started so as to draw flake from the hopper at the specified rate. The first loader, atop the hopper, was also started so as to keep the hopper replenished with a flake blend made from example bottles and PET PCR. Each hour during the test, several loads airveyed from the hopper were captured and weighed to assess flow rate. Flake airveyed from the hopper was also passed through a 0.5-in by 0.5-in mesh screen to capture small clumps, if any, of PET PCR stuck together by flake from example bottles. The test continued for several hours until the test blend had passed through the hopper or until such time as flow was severely impeded or stopped due to excessive clumping or bridging in the hopper.

A mixture of 5% flake of Composition A in PET flake showed virtually no clumping in the dryer and did not impede flow from the dryer. By contrast, a mixture of 3% flake of Comparative Composition B in PET flake caused severe clumping in the dryer and completely stopped flow from the dryer. A blend of 1 weight % of Comparative Composition B in PET flake did not impede flow but did show moderate clumping.

The invention has been described in detail with reference to the embodiments disclosed herein, but it will be understood that variations and modifications can be effected within the spirit and scope of the invention.

What is claimed is:

1. An extrusion blow molded article comprising at least one polyester which comprises:
   (a) a dicarboxylic acid component comprising:
      (i) about 90 to about 100 mole % of terephthalic acid residues;
      (ii) about 0 to about 10 mole % of aromatic and/or aliphatic dicarboxylic acid residues having up to 20 carbon atoms; and
   (b) a glycol component consisting essentially of:
      (i) 45 to 55 mole % ethylene glycol residues; and
      (ii) 45 to 55 mole % residues of 1,4-cyclohexanedimethanol; and
      (iii) about 2 mole % or less of diethylene glycol;
   (c) at least one branching agent in the amount of 0.01 to 1.0 mole %;
   wherein the total mole % of the dicarboxylic acid component is 100 mole %, and
   wherein the total mole % of the glycol component is 100 mole %; and
   wherein the inherent viscosity of the polyester is from 0.50 to 1.0 dL/g as determined in 60/40 (wt/wt) phenol/tetrachloroethane at a concentration of 0.25 g/50 ml at 25° C.; wherein said at least one polyester has a crystallization half-time from the glass phase of less than 500 minutes when measured at 160° C.; and wherein from about 0.1 to about 6.0 weight % of said at least one polyester can be blended with ISBM PET to produce a second article having a haze value of less than 3%, when measured on a film 16 mils thick, as measured by ASTM D1003, Method A.

2. The article of claim 1 wherein the branching agent is present in the amount of 0.1 to 0.6 weight % based on the total weight of the polyester.

3. The article of claim 1 wherein the branching agent is chosen from at least one of the following trimellitic acid, trimellitic anhydride, trimethylolpropane, pentaerythritol, and/or trimethylolethane.

4. The article of claim 1 wherein the inherent viscosity of the polyester is from 0.5 to 0.9 dL/g.

5. The article of claim 1 wherein the inherent viscosity of the polyester is from 0.65 to 0.8 dL/g.

6. The article of claim 1 wherein the inherent viscosity of the polyester is from 0.70 to 0.80 dL/g.

7. The article of claim 1 wherein the Tg of the polyester is from 75 to 95° C.

8. The article of claim 1 comprises at least one additive chosen from colorants, mold release agents, phosphorus compounds, plasticizers, nucleating agents, UV stabilizers, glass fiber, carbon fiber, fillers, impact modifiers, or a mixture thereof.

9. The article of claim 1 which comprises a container.

10. The article of claim 1 which comprises a bottle.

11. An extrusion blow molded article comprising a blend comprising:
   (1) from 0.1 weight % to less than 6.0 weight % of at least one polyester which comprises:
   (a) a dicarboxylic acid component comprising:
      (i) about 90 to about 100 mole % of terephthalic acid residues;
      (ii) about 0 to about 10 mole % of aromatic and/or aliphatic dicarboxylic acid residues having up to 20 carbon atoms; and
   (b) a glycol component consisting essentially of:
      (i) 45 to 55 mole % ethylene glycol residues; and
      (ii) 45 to 55 mole % residues of 1,4-cyclohexanedimethanol; and
      (iii) about 2 mole % or less of diethylene glycol;
   (c) at least one branching agent in the amount of 0.01 to 1.0 mole %;
   wherein the total mole % of the dicarboxylic acid component is 100 mole %, and
   (2) from 94 wt % to 99.1 wt % of ISBM PET,
   wherein the total mole % of the dicarboxylic acid component is 100 mole %,
   wherein the total mole % of the glycol component is 100 mole %;
   wherein the inherent viscosity of the polyester is from 0.50 to 1.0 dL/g as determined in 60/40 (wt/wt) phenol/tetrachloroethane at a concentration of 0.25 g/50 ml at 25° C.; wherein said at least one polyester has a crystallization half-time from the glass phase of less than 500 minutes when measured at 160° C.; and wherein said blend has a haze value of less than 3%, when measured on a film 16 mils thick, as measured by ASTM D1003, Method A.

12. An extrusion blow molded article comprising a blend comprising:
   (1) from 0.1 weight % to less than 6.0 weight % of at least one polyester which comprises:
   (a) a dicarboxylic acid component comprising:
      (i) about 95 to about 100 mole % of terephthalic acid residues;
      (ii) about 0 to about 10 mole % of aromatic and/or aliphatic dicarboxylic acid residues having up to 20 carbon atoms; and
   (b) a glycol component consisting essentially of:
      (i) 45 to 55 mole % ethylene glycol residues; and
      (ii) 45 to 55 mole % residues of 1,4-cyclohexanedimethanol; and
      (iii) about 2 mole % or less of diethylene glycol;
   (c) at least one branching agent in the amount of 0.01 to 1.0 mole %;
   wherein the total mole % of the dicarboxylic acid component is 100 mole %, and (2) from 94 wt % to 99.1 wt % of ISBM PET,
wherein the total mole % of the dicarboxylic acid component is 100 mole %,
wherein the total mole % of the glycol component is 100 mole %;
wherein the inherent viscosity of the polyester is from 0.50 to 1.0 dL/g as determined in 60/40 (wt/wt) phenol/tetrachloroethane at a concentration of 0.25 g/50 ml at 25° C.; wherein said at least one polyester has a crystallization half-time from the glass phase of less than 500 minutes when measured at 160° C.; and wherein said blend has a haze value of less than 3%, when measured on a film 16 mils thick, as measured by ASTM D1003, Method A.

* * * * *